AUTOMATIC FREQUENCY CONTROL SYSTEM FOR CONTROLLING THE FREQUENCY OF THE LOCAL OSCILLATOR USED IN A DIFFERENTIAL PHASE MODULATED PCM RECEIVER

Filed Oct. 5, 1966

3 Sheets-Sheet 1

INVENTOR
S. E. MILLER
BY Sylvan Sherman
ATTORNEY

United States Patent Office 3,479,600
Patented Nov. 18, 1969

3,479,600

AUTOMATIC FREQUENCY CONTROL SYSTEM FOR CONTROLLING THE FREQUENCY OF THE LOCAL OSCILLATOR USED IN A DIFFERENTIAL PHASE MODULATED PCM RECEIVER

Stewart E. Miller, Locust, N.J., assignor to Bell Telephone Laboratories, Incorporated, Murray Hill, N.J., a corporation of New York Filed Oct. 5, 1966, Ser. No. 584,597
Int. Cl. H04b *1/12, 1/26*
U.S. Cl. 325—423 3 Claims

ABSTRACT OF THE DISCLOSURE

An automatic frequency control system for use in a differential phase modulated PCM signal receiver in which an error signal produced in the sum branch and/or the difference branch of a differential phase detector is used to generate a correction voltage for the receiver local oscillator. The AFC circuit includes means for determining the phase of the error signal and means for minimizing the effects of information content upon the phase of the correction voltage.

This invention relates to automatic frequency control (AFC) arrangements for controlling the frequency of the local oscillator used in FM-differential phase shift PCM communications systems. More particularly, it relates to AFC arangements which will operate for any arbitrary PCM pulse pattern.

In the copending application by W. D. Warters, Ser. No. 568,893, filed July 29, 1966, there is described a differential phase PCM system which utilizes frequency modulation techniques to produce the required phase modulation (FM–DPM). It is readily apparent that for optimum operation of such a system, the inadvertent introduction of spurious frequency modulation is advantageously avoided. Since one possible source of significant spurious modulation is the local oscillator used to down-convert the carrier signal at repeater stations or at the receiver end of the system, it is advantageous to provide some means for automatically controlling the local oscillator frequency.

In accordance with the present invention, the error signal produced in the sum branch and/or the difference branch of a differential phase detector (of the type used in the receiver of a differential phase modulated PCM communications systems) is used to generate the oscillator correction voltage for the receiver local oscillator. Means are provided for determining the phase of the error signal in order to apply frequency correction in the proper sense. Means are also provided for minimizing the effects of information content upon the phase of the correction voltage.

In one specific embodiment of the invention, the error signal in the sum branch of the differential phase detector is used to generate the oscillator correction voltage. In a second embodiment of the invention, the error signal in both the sum and the difference branches of the differential phase detector are employed.

Figures 1, 2:
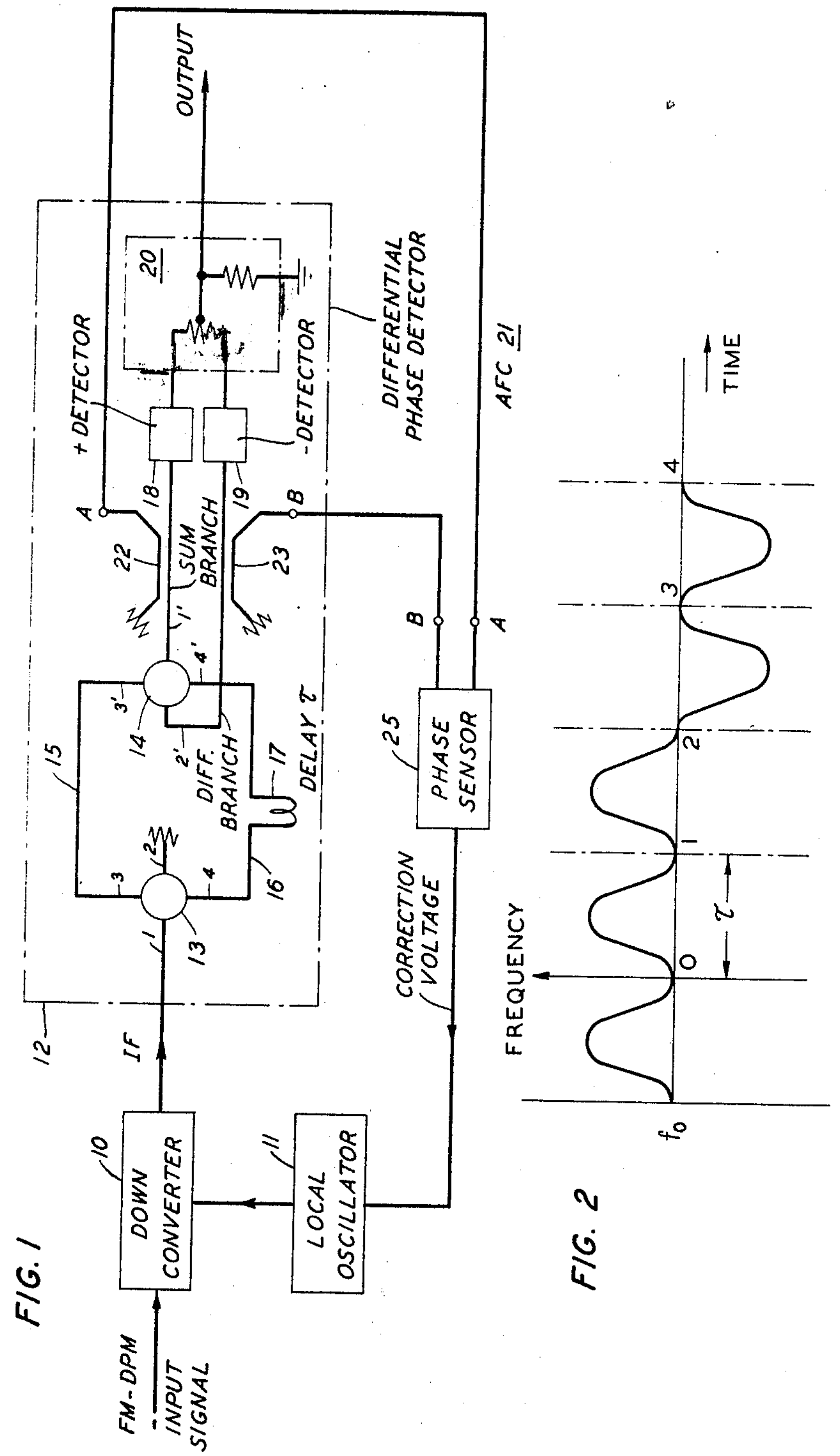
Figure 3A:
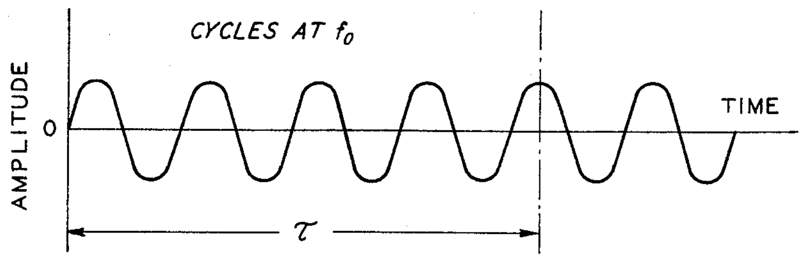
Figure 3B:
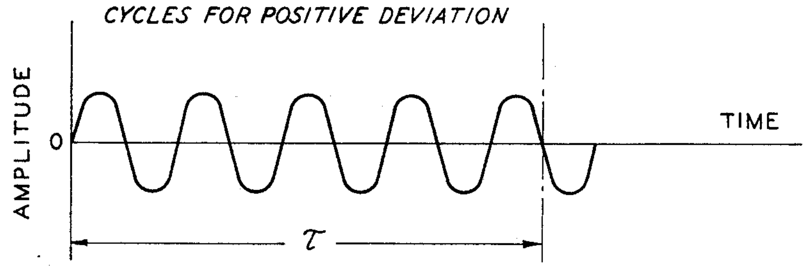
Figure 3C:
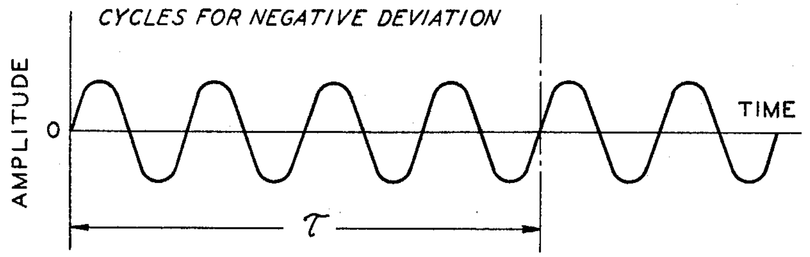
Figure 4A:
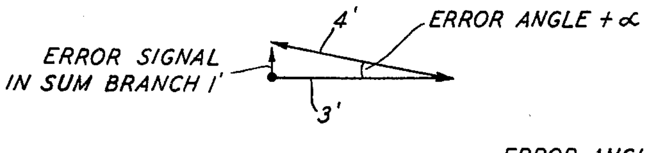
Figure 4B:
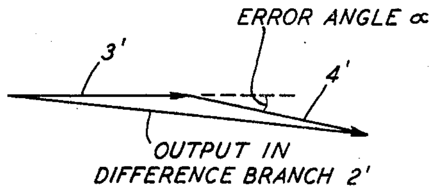
Figure 5:
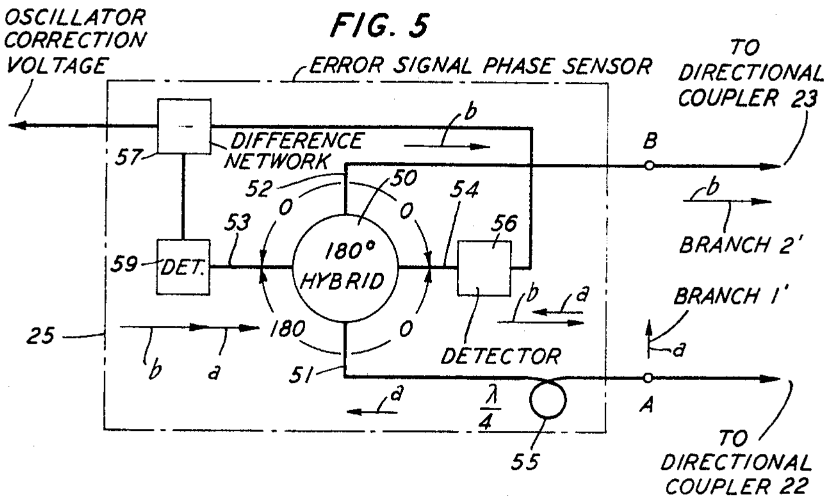
Figure 6:
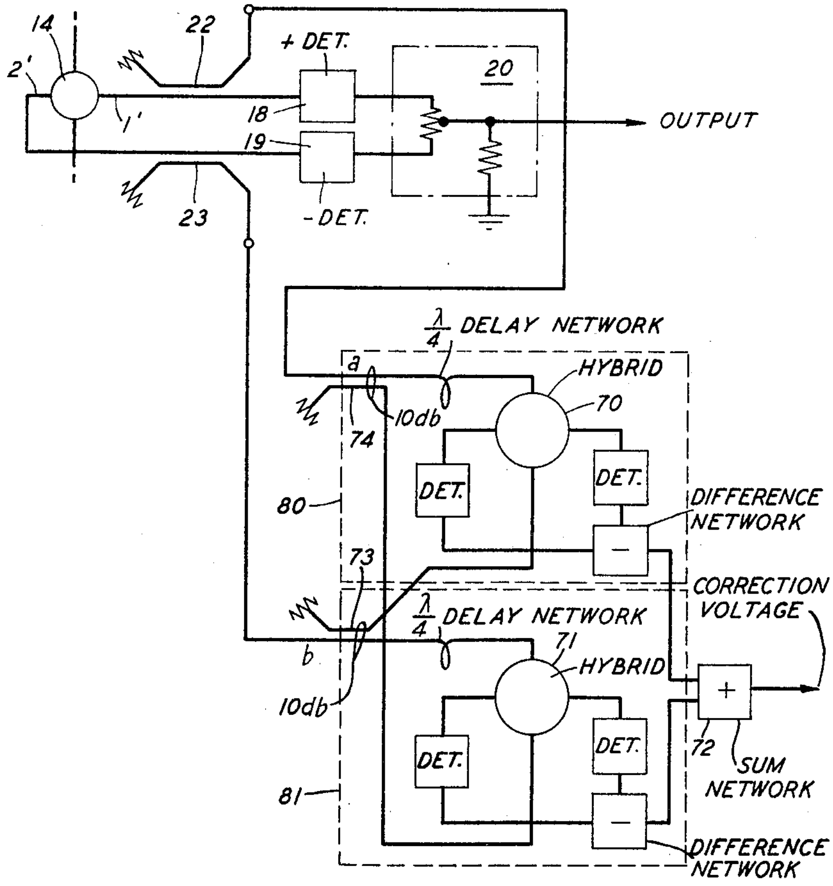

These and other objects and advantages, the nature of the present invention, and its various features, will appear more fully upon consideration of the various illustrative embodiments now to be described in detail in connection with the accompanying drawings, in which:

FIG. 1 shows an FM–DPM receiver including a differential phase detector and an automatic frequency control circuit in accordance with the invention;

FIG. 2, included for purposes of explanation, shows the frequency deviation for an illustrative signal pulse train;

FIGS. 3A, 3B and 3C, included for purposes of explanation, show the number of intermediate frequency cycles per pulse time interval for different signal conditions;

FIGS. 4A and 4B, included for purposes of explanation, are vector diagrams showing the signal components in the sum and difference branches of the differential phase detector when the local oscillator is improperly tuned;

FIG. 5 is an illustrative embodiment of a phase sensor for use in an AFC circuit in accordance with the invention; and FIG. 6 shows an AFC circuit that is independent of the information content of the signal.

Referring to the drawings, FIG. 1 shows, in block diagram, a portion of a receiver for use in a FM–DPM transimssion system, including a down-converter 10, a voltage-controlled local oscillator 11, and a differential phase detector 12. The latter, whose mode of operation is well known in the art, and is described in some detail in the above-cited copending application by W. D. Warters, typically comprises a pair of similar hybrid junctions 13 and 14, each of which has two pairs of conjugate branches. The pairs of conjugate branches associated with hybrid 13 are designated 1–2 and 3–4. Those associated with hybrid 14 are designated 1′–2′ and 3′–4′.

As illustrated in FIG. 1, branch 1 of hybrid 13 is the input branch to which the intermediate frequency signal is applied. Branch 2 is resistively terminated. Branches 3 and 4 of hybrid 13 are connected to branches 3′ and 4′, respectively, of hybrid 14 by means of wavepaths 15 and 16. One of the wavepaths 16 includes a delay network 17 for reasons which will be explained in greater detail hereinbelow.

The remaining branches 1′ and 2′ of hybrid 14 are connected respectively to detectors 18 and 19 which, in turn, are connected to a resistive output network 20. The phase detector output is obtained from this network.

It is the function of the phase detector to compare the relative phase of the signals in adjacent time slots. In a binary system, a comparison which indicates that there has been no relative phase shift is indicative of one of the two binary states, whereas a 180 degree phase shift is indicative of the other binary state. Accordingly, there are means 17 provided in wavepath 16 to delay the signal in path 16 one time slot and to introduce any additional delay which may be needed to establish the desired in-phase or out-of-phase signal relationships at branches 3′ and 4′ of hybrid 14. If the two signal components from adjacent time slots are in phase, they combine in branch 1′, (designated the "sum" branch) causing a current to flow in the + detector 18 and in the resistive network 20 in a direction to produce a positive output pulse. If, on the other hand, the two signal components are out of phase, they combine in branch 2′ (designated the "difference" branch) thereby causing a current to flow in the − detector 19 and in resistive network 20 in the opposite direction, thus producing a negative output pulse. In this manner the original binary baseband signal is recovered.

It is readily apparent that if there is any drift in the frequency of the local oscillator a spurious phase indication can be obtained, and an error introduced in the detected signal. To minimize this possibility, an automatic frequency control (AFC) circuit 21 is included in the receiver to control the frequency of local oscillator 11. The AFC circuit, which will be described in greater detail hereinbelow, samples the signals in the sum difference branches 1′ and 2′ of hybrid 14 by means of directional couplers 22 and 23, and generates an oscillator correction voltage in a phase sensor 25 to correct the local oscillator frequency.

The operation of the AFC circuit can be explained by considering the specific signal pulse train illustrated in FIG. 2, which includes three pulses during which the signal carrier frequency increases, followed by two pulses during which the signal carrier frequency decreases. The pulse duration $\tau$ and the sampling periods 0, 1, 2 et cetera are also indicated in FIG. 2. For purposes of illustration, an intermediate frequency $f_4$ is selected such that there are 4¼ cycles in the interval $\tau$. Therefore, $$\tau = \frac{4\frac{1}{4}}{f_0} \qquad (1)$$

Because of the frequency modulation, the phase of the signal is either advanced or retarded by 90 degrees during each pulse period. This means that during the first three time intervals of the signal depicted in FIG. 2, when the deviation is positive, there are 4½ (distorted) I.F. cycles, whereas during the last two time intervals, when the deviation is negative, there are only 4 I.F. cycles. This is illustrated in FIGS. 3A, 3B and 3C which show, respectively, 4¼ cycles in time period $\tau$ for the unmodulated carrier signal, 4½ cycles for a positive frequency deviation, and 4 cycles for a negative frequency deviation.

When the signal in adjacent time slots are compared at times 0, 1, 2 et cetera, it is seen that they are out of phase when $\Delta f$ is positive, whereas they are in-phase when $\Delta f$ is negative.

By referring to the curves shown in FIGS. 3B and 3C, the following tabulation of normalized currents (or voltages) at the various branches of hybrid junction 14 can be made for the pulse sequence illustrated in FIG. 2.

TABLE I

| Sampling time | 0 | 1 | 2 | 3 | 4 | 5 | 6 |
|---|---|---|---|---|---|---|---|
| Location: | | | | | | | |
| 3′ | $0.707\angle 0$ | $0.707\angle \pi$ | $0.707\angle 0$ | $0.707\angle 0$ | $0.707\angle 0$ | $0.707\angle \pi$ | $0.707\angle \pi$ |
| 4′ | $0.707\angle \pi$ | $0.707\angle 0$ | $0.707\angle \pi$ | $0.707\angle 0$ | $0.707\angle 0$ | $0.707\angle 0$ | $0.707\angle \pi$ |
| 1′ (sum branch) | 0 | 0 | 0 | $1\angle 0$ | $1\angle 0$ | 0 | $1\angle \pi$ |
| 2′ (difference branch) | $1.0\angle 0$ | $1\angle \pi$ | $1\angle 0$ | 0 | 0 | $1\angle \pi$ | 0 |

From this tabulation it is seen that when the signal components in branches 3′ and 4′ are equal, and out of phase, as they are at sampling periods 0, 1, 2 and 5 (hereinafter known as a time "0" type signal), they combine in the difference branch 2′, with no signal being coupled to the sum branch 1′. Similarly, when the signals in branches 3′ and 4′ are equal, and in phase, as they are at sampling times 3, 4 and 6 (hereinafter known as a time "3" type signal), they combine in the sum branch 1′, with no signal being coupled to the difference branch 2′. If, however, local oscillator 11 is not properly tuned, the two signal components will not be exactly out of phase, or exactly in phase. Instead there is an error angle introduced between the two signal components which produces an error signal when the signal components are subtracted from each other. This is illustrated in the vector diagram in FIG. 4A which shows the two signal components in branches 3′ and 4′ for a time "0" type signal, and the resulting error signal produced in the sum branch 1′. FIG. 4B shows the two signal components in branches 3′ and 4′, and how they combine in the difference branch 2′.

It will be noted in FIG. 4A that the resultant signal in the sum branch has a phase which depends upon the sign of the error signal $\alpha$. If the local oscillator frequency drifts in the opposite direction from that illustrated, the error angle is negative, and the direction of the error signal in the sum branch reverses its direction by approximately 180 degrees. This signal can therefore be used as a means for generating the AFC correction voltage since its phase varies as a function of the sense of the local oscillator frequency error.

FIG. 5 is an illustrative embodiment of the phase sensor circuit, indicated as block 25 in FIG. 1, for utilizing the error signal produced in the sum branch of hybrid 14 to correct the local oscillator frequency. The phase sensor circuit, which senses the phase of the error signal, comprises a 180 degree hybrid junction 50, having two pairs of conjugate branches 51–52 and 53–54. Branch 51 is connected to one of the directional couplers 22 through a delay network 55. Branch 52 is connected to the other directional coupler 23. The other two branches 53 and 54 are connected to amplitude detectors 59 and 56, respectively. The output from the detectors are, in turn, connected to a difference network 57, which generates the oscillator correction voltage.

In operation, directional couplers 22 and 23 sample the signals in the sum and difference branches 1′ and 2′, respectively, of hybrid 14, and couple the sampled signals to the sensor circuit. Typically, 3, to 10 db couplers can be used for this purpose. As indicated in FIGS. 4A and 4B, the sampled signals are approximately in time quadrature, and are so indicated by the two vectors $a$ and $b$ at the terminals of branches A and B, respectively, of the sensor circuit. To establish the desired in-phase and out-of-phase relationships required at hybrid 50 in the sensor network, a quarter wavelength delay 55 is introduced in branch A which further delays signal $a$ so that the signals $a$ and $b$ are 180 degrees out of phase at branches 51 and 52 of hybrid 50. Half of each signal $a$ and $b$ couples to branch 54 of the hybrid with no further relative phase shift, and add out of phase. The other two halves of signals $a$ and $b$ couple to branch 53 of the hybrid with an additional 180 degree phase shift, and add in phase.

The two resultant signals derived from hybrid 50 are amplitude-detected in detectors 56 and 59, and the difference in their amplitudes derived in the difference network 57. This difference signal is the oscillator correction voltage.

As indicated above, it is the function of the phase sensor 25 to determine the sense of the error signal generated in the differential phase detector. In this connection, it can readily be shown that if a negative error angle is assumed in FIG. 4A, signal component $a$ is reversed 180 degrees, and as a result a difference signal of opposite sign is produced in the difference network 57. Thus, the sense of the correction voltage is determined by the sense of the error.

The operation described hereinabove, is based upon pulse conditions at sampling times 0, 1, 2 and 5. If the operation of the AFC circuit is also examined at times 3, 4 and 6, at which times the error signal appears in the difference branch 2′, the sign of the oscillator correction voltage is found to be reversed from that obtained at sampling times 0, 1, 2 and 5. This means that the sign of the correction voltage is not independent of the information content of the signal. It thus becomes necessary to bias the system in favor of one or the other of the two signal conditions and to adjust the system accordingly. This can be done, for example, by attenuating the signal $b$ so that when the error signal occurs in branch 2′, its contribution is attenuated. It can then be shown that for random signal content, the phase conditions established by a time "0" type signal will dominate the AFC system, and proper control of the oscillator frequency will be maintained.

One method of biasing the AFC system is to design directional coupler 23 such that its coefficient of coupling is less than the coefficient of coupling of directional coupler 22 by approximately 10 decibels. Alternatively, the directional couplers can be the same, and an attenuator added to branch B of the AFC circuit, or any other circuit arrangement can be made such that the overall means whereby the sum and difference branches of the phase detector are sampled are sufficiently unequal that little or no correction voltage is generated when the error signal occurs in branch 2′ of hybrid 14.

While an error signal generated in branch 2′ of hybrid 14 causes an incorrectly phased correction signal to be generated in the phase sensor circuit 25, there is nevertheless no reason why this error signal cannot be used to generate a properly phased correction signal. This can be done simply by providing a second phase sensor, adapted to operate with an error signal derived from difference branch 2′. This second sensor can be made to develop a second correction signal having the correct sense, which can then be added to the correction signal generated by an error signal in branch 1′. Such an arrangement is shown in FIG. 6, which utilizes two phase sensor circuits 80 and 81 in which the rolls played by the *a* and *b* signals are reversed. Specifically, phase sensor 81 operates upon time "3" type signals, whereas phase sensor 80 operates, as described hereinbefore, on time "0" type signals. The correction voltage generated by both type signals are added in a sum network 72 to produce the local oscillator correction voltage. To minimize the effect of time "3" type signals upon phase sensor 80, the *b* signal coupled to hybrid 70 is attenuated relative to the *a* signal by means of a 10 decibel directional coupler 73 located between the *b* signal circuit and hybrid 70. Similarly, to minimize the effect of time "0" type signals upon phase sensor 81, the *a* signal coupled to hybrid 71 is attenuated relative to the *b* signal by means of a 10 decibel directional coupler 74 located between the *a* signal circuit and hybrid 71.

This latter arrangement, using two separate phase sensors, has the advantage that a local oscillator correction voltage of the proper sense is generated regardless of the information content of the signal. On the other hand, if only one phase sensor is used in the AFC circuit, as in FIG. 1, there is always the possibility that the information content of the signal might be limited to a time "3" type signal over an extended period of time and, as a result, no correction voltage would be generated.

In all cases it is understood that the above described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In a differential phase modulated, pulse code modulation system, a receiver including:
- a voltage-controlled oscillator and a differential phase detector;
- said detector having sum and difference signal branches;
- sampling means having unequal sensitivities for extracting a portion of the signal in each of said branches;

- means for adding and for substracting components of said extracted signal portions to produce a sum signal and a difference signal;
- means for amplitude detecting said sum and said difference signals;
- means for substracting said detected signals; and
- means for applying the resultant voltage derived from said subtracting means to said local oscillator for controlling the frequency thereof.

2. Automatic means for controlling the frequency of a local oscillator in a differential phase modulated PCM signal receiver comprising:
- a frequency down-converter;
- a voltage-controlled oscillator;
- a differential phase detector having sum and difference signal branches;
- means for coupling said oscillator to said down-converter;
- means for coupling said down-converter to said differential phase detector;
- first and second phase sensor circuits;
- means for coupling a fraction of the signal in said sum branch to said first phase sensor;
- means for coupling a fraction of the signal in said difference branch to said second phase sensor;
- means for coupling a smaller fraction of the signal in said sum branch to said second phase sensor;
- means for coupling a smaller fraction of the signal in said difference branch to said first phase sensor;
- characterized in that said phase sensors produce, in response to said coupled signals, an error correction voltage whose amplitude and phase is a function of the detuning of said oscillator;
- a sum network for adding said error correction voltages; and
- means for applying the resultant voltage derived from sum network to said oscillator for correcting the frequency thereof.

3. The automatic frequency control circuit according to claim 2 wherein each phase sensor includes:
- means for adding and means for substracting components of said coupled signals to produce sum and difference signals;
- means for amplitude detecting said sum and difference signals; and
- means for substracting said detected signals.

References Cited

UNITED STATES PATENTS 3,181,122 4/1965 Brown ............ 340—170

KATHLEEN H. CLAFFY, Primary Examiner

C. JIRAUCH, Assistant Examiner

U.S. Cl. X.R.

325—346